(12) United States Patent
Ishiguro et al.

(10) Patent No.: US 11,989,654 B2
(45) Date of Patent: May 21, 2024

(54) LEARNING AND USING A SINGLE FORECAST MODEL FOR DEMAND FORECASTING

(71) Applicant: NTT DOCOMO, INC., Chiyoda-ku (JP)

(72) Inventors: Shin Ishiguro, Chiyoda-ku (JP); Yusuke Fukazawa, Chiyoda-ku (JP); Satoshi Kawasaki, Chiyoda-ku (JP); Haruka Kikuchi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 962 days.

(21) Appl. No.: 16/967,063

(22) PCT Filed: Jan. 16, 2019

(86) PCT No.: PCT/JP2019/001119
§ 371 (c)(1),
(2) Date: Aug. 3, 2020

(87) PCT Pub. No.: WO2019/159585
PCT Pub. Date: Aug. 22, 2019

(65) Prior Publication Data
US 2021/0049472 A1    Feb. 18, 2021

(30) Foreign Application Priority Data
Feb. 14, 2018 (JP) ................. 2018-024331

(51) Int. Cl.
*G06N 3/08* (2023.01)
*G06N 3/084* (2023.01)
(Continued)

(52) U.S. Cl.
CPC ............... *G06N 3/084* (2013.01); *G06N 3/09* (2023.01); *G06N 20/00* (2019.01); *G06Q 10/04* (2013.01); *G06Q 50/40* (2024.01)

(58) Field of Classification Search
CPC .......... G06Q 10/04; G06Q 50/30; G06N 3/04; G06N 3/08; G06N 20/00; G06N 3/084; G06N 3/09
See application file for complete search history.

(56) References Cited

U.S. PATENT DOCUMENTS

| 10,719,899 B1* | 7/2020 | Dabell | G06Q 50/26 |
| 10,936,947 B1* | 3/2021 | Flunkert | G06N 3/044 |
| 2019/0147368 A1* | 5/2019 | Pinel | G06N 5/022 706/12 |

FOREIGN PATENT DOCUMENTS

JP    2016-75972 A    5/2016

OTHER PUBLICATIONS

Kong, Xiangjie, et al. "Time-location-relationship combined service recommendation based on taxi trajectory data." IEEE Transactions on Industrial Informatics 13.3 (2017): 1202-1212. (Year: 2017).*
(Continued)

*Primary Examiner* — Hal Schnee
(74) *Attorney, Agent, or Firm* — Oblon, McClelland, Maier & Neustadt, L.L.P.

(57) ABSTRACT

A learning system includes a learning data acquisition unit that generates a neural network included in a single forecast model for performing a forecast of demand for a service through machine learning and acquires, as learning data, an actual demand value of the service and a feature amount for learning for each mesh associated with a past period, the feature amount for learning including the number of demands for the service in each mesh in each period as a feature amount, a learning data normalization unit that normalizes at least the number of demands in the feature
(Continued)

amount for learning for each mesh, and a generation unit that performs machine learning on the basis of an actual demand value and a demand forecast value obtained by inputting the feature amount for learning including the normalized number of demands to the neural network, and generates the neural network.

11 Claims, 10 Drawing Sheets

(51) Int. Cl.
  *G06N 3/09* (2023.01)
  *G06N 20/00* (2019.01)
  *G06Q 10/04* (2023.01)
  *G06Q 50/40* (2024.01)

(56) References Cited

OTHER PUBLICATIONS

Tong, Yongxin, et al. "The simpler the better: a unified approach to predicting original taxi demands based on large-scale online platforms." Proceedings of the 23rd ACM SIGKDD international conference on knowledge discovery and data mining. 2017. (Year: 2017).*

Ioffe, Sergey, and Christian Szegedy. "Batch normalization: Accelerating deep network training by reducing internal covariate shift." International conference on machine learning. pmlr, 2015. (Year: 2015).*

Allen, Chris, et al. "Applying GIS and machine learning methods to Twitter data for multiscale surveillance of influenza." PloS one 11.7 (2016): e0157734. (Year: 2016).*

Peng, Xuefeng, Yiming Pan, and Jiebo Luo. "Predicting high taxi demand regions using social media check-ins." 2017 IEEE International Conference on Big Data (Big Data). IEEE, 2017. (Year: 2017).*

Japanese Office Action issued May 25, 2021 in Japanese Patent Application No. 2020-500333 (with English translation), 6 pages.

Shin Ishiguro, et al., "Real-Time Population based Taxi Demand Forecast using Stacked denoising Autoencoders", Information Processing Society of Japan, vol. 2017-mbl-84 No. 21, Aug. 30, 2017. pp. 1-6 (with partial English translation).

English translation of the International Preliminary Report on Patentability and Written Opinion of the International Searching Authority issued on Aug. 27, 2020 in PCT/JP2019/001119, 6 pages.

International Search Report issued on Feb. 19, 2019 in PCT/JP2019/001119 filed on Jan. 16, 2019.

* cited by examiner

Fig. 6

| REFERENCE PERIOD | MESH ID | ITEM | FEATURE AMOUNT | | | |
|---|---|---|---|---|---|---|
| | | | 30 MINUTES AGO TO PRESENT TIME | AN HOUR AGO TO 30 MINUTES AGO | 1.5 HOURS AGO TO AN HOUR AGO | ... |
| 2017/12/15 12:00 | A1 | NUMBER OF DEMANDS | ... | ... | ... | ... |
| | | POPULATION | ... | ... | ... | ... |
| | | WEATHER | ... | ... | ... | ... |
| | A2 | NUMBER OF DEMANDS | ... | ... | ... | ... |
| | | POPULATION | ... | ... | ... | ... |
| | | WEATHER | ... | ... | ... | ... |
| | A3 | NUMBER OF DEMANDS | ... | ... | ... | ... |
| | | POPULATION | ... | ... | ... | ... |
| | | WEATHER | ... | ... | ... | ... |
| | ... | ... | ... | ... | ... | ... |
| 2017/12/15 12:30 | A1 | NUMBER OF DEMANDS | ... | ... | ... | ... |
| | | POPULATION | ... | ... | ... | ... |
| | | WEATHER | ... | ... | ... | ... |
| | A2 | NUMBER OF DEMANDS | ... | ... | ... | ... |
| | | POPULATION | ... | ... | ... | ... |
| | | WEATHER | ... | ... | ... | ... |
| | A3 | NUMBER OF DEMANDS | ... | ... | ... | ... |
| | | POPULATION | ... | ... | ... | ... |
| | | WEATHER | ... | ... | ... | ... |
| ... | ... | ... | ... | ... | ... | ... |

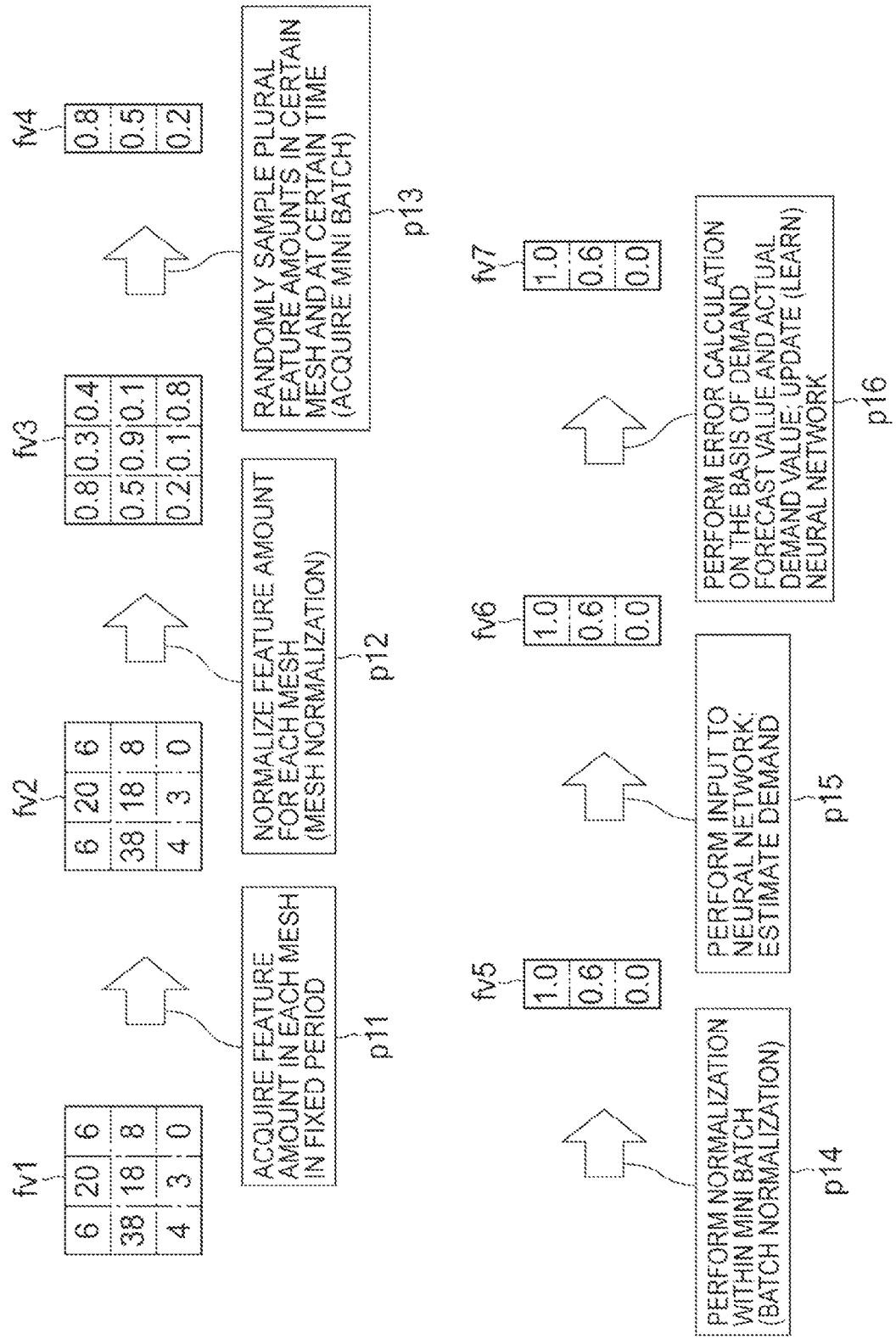

LEARNING AND USING A SINGLE FORECAST MODEL FOR DEMAND FORECASTING

TECHNICAL FIELD

The present invention relates to a learning system, an estimation system and a learned model.

BACKGROUND ART

A system that performs a forecast of demand for a service is known. For example, in a system that forecasts demand for a taxi, the number of demands for every place demarcated by a predetermined range and every time (for example, every mesh having a square with sides of 500 m every 30 minutes) is forecasted. Patent Literature 1 discloses a technique in which information based on forecast values relating to the number of passengers in a plurality of districts on a map divided into a plurality of districts is displayed on the districts in association. The information based on forecast values relating to the number of passengers is output on the basis of the number of demands for a passenger vehicle for each district and the number of empty passenger vehicles, and the number of demands is output on the basis of a model according to a neural network.

CITATION LIST

Patent Literature

[Patent Literature 1] Japanese Unexamined Patent Publication No. 2016-75972

SUMMARY OF INVENTION

Technical Problem

In a problem for forecasting the number of demands for a service for each area (mesh) which is a geographical range demarcated by a predetermined range, there are a method of creating a forecast model for each mesh and a method of creating a single model regardless of a mesh. In a case where a mesh having a peculiar feature is included in a forecast target, the creation of a forecast model for each mesh is effective, but such a method has a disadvantage in that errors are likely to increase in a case where noise is contained in a feature amount which is input to the model, or the like.

On the other hand, a method of performing a forecast using a single model has an advantage in that it is robust against noise and can be universally applied to all meshes. In addition, in the method of performing a forecast using a single model, it is possible to use the characteristics of deep learning in which data of an area resembling a certain area is utilized in a forecast of demand in the area by inputting a large volume of data of many areas. However, in the method of performing a forecast using a single model, errors in a forecast model are likely to increase in a case where there is a deviation between meshes in the distribution of the frequencies of occurrence of a value of the number of demands in input data.

Consequently, the present invention was contrived in view of the above problems, and an object thereof is to provide a learning system, an estimation system and a learned model that make it possible to reduce errors and to perform a high-accuracy forecast even in a case where there is a deviation in the distribution of the frequencies of occurrence of the number of demands on the occasion of a forecast of the number of demands for a service for each area using a single model.

Solution to Problem

In order to solve the above problem, according to an aspect of the present invention, there is provided a learning system configured to generate a neural network through machine learning in a demand forecast system for performing a forecast of demand for a predetermined service for each mesh indicating a predetermined geographical range using a single forecast model including the neural network generated through machine learning, the learning system including: a learning data acquisition unit configured to acquire, as learning data, a feature amount for learning for each mesh associated with a past period, that is, a feature amount for learning including at least the number of demands for the service in each mesh in each period, as a feature amount; a learning data normalization unit configured to normalize the feature amount for learning included in the learning data for each mesh, the learning data normalization unit normalizing at least the number of demands in the feature amount for learning; and a generation unit configured to perform machine learning on the basis of a demand forecast value that is the number of forecasts of demand for the service which is obtained by inputting the feature amount for learning including the number of demands normalized by the learning data normalization unit to the neural network, and generates the neural network.

According to the above aspect, the number of demands included in the feature amount for learning is input to the neural network after it is normalized for each mesh. Thereby, the neural network in which a discrepancy in the property of the action of a feature amount due to a difference in the scale of the number of demands for each mesh has been considered is generated. Therefore, a single forecast model that makes it possible to perform a high-accuracy forecast in which errors is reduced is obtained.

In order to solve the above problem, according to an aspect of the present invention, there is provided an estimation system configured to estimate demand for a service using a forecast model including a neural network generated by the learning system, the estimation system including: a feature amount acquisition unit configured to acquire a feature amount for each mesh associated with a target period of a demand estimation, that is, a feature amount including at least the number of demands for the service in the mesh in a period associated with the target period; a normalization unit configured to normalize the feature amount acquired by the feature amount acquisition unit for each mesh, the normalization unit normalizing at least the number of demands in the feature amounts; an estimation unit configured to input the feature amount including the number of demands normalized by the normalization unit to the neural network of the forecast model and estimate the number of demands for the service in the target period; and an output unit configured to output the number of demands estimated by the estimation unit as a demand estimation value. The neural network of the forecast model which is used in the estimation system outputs the number of demands for the service in a predetermined target period associated with a past period using, as an input value, a feature amount for each mesh associated with the period, that is, a feature amount including at least the number of demands for the service in each mesh in each period normalized for each mesh.

According to the above aspect, the number of demands included in a feature amount associated with the target period of a demand estimation is input to the neural network after it is normalized for each mesh. Thereby, the number of demands in which a discrepancy in the property of the action of a feature amount due to a difference in the scale of the number of demands for each mesh has been considered is estimated.

In order to solve the above problem, according to an aspect of the present invention, there is provided a learned model for performing a forecast of demand for a predetermined service for each mesh indicating a predetermined geographical range, the learned model including a neural network generated through machine learning, wherein the neural network outputs a demand forecast value that is the number of forecasts of demand for the service in a predetermined target period associated with a past period using, as an input value, a feature amount for each mesh associated with the period, that is, a feature amount including at least the number of demands for the service in each mesh in each period normalized for each mesh.

According to the above aspect, the feature amount including the number of demands normalized for each mesh is input to the neural network. Thereby, the forecast value of demand in which a discrepancy in the property of the action of a feature amount due to a difference in the scale of the number of demands for each mesh has been considered is output.

Advantageous Effects of Invention

It is possible to provide a learning system, an estimation system and a learned model that make it possible to reduce errors and to perform a high-accuracy forecast even in a case where there is a deviation in the distribution of the frequencies of occurrence of the number of demands on the occasion of a forecast of the number of demands for a service for each area using a single model.

BRIEF DESCRIPTION OF DRAWINGS

FIG. 6 is a diagram illustrating an example of a feature amount for learning.

FIG. 7 is a diagram schematically illustrating processes in the learning system.

DESCRIPTION OF EMBODIMENTS

Figure 1:
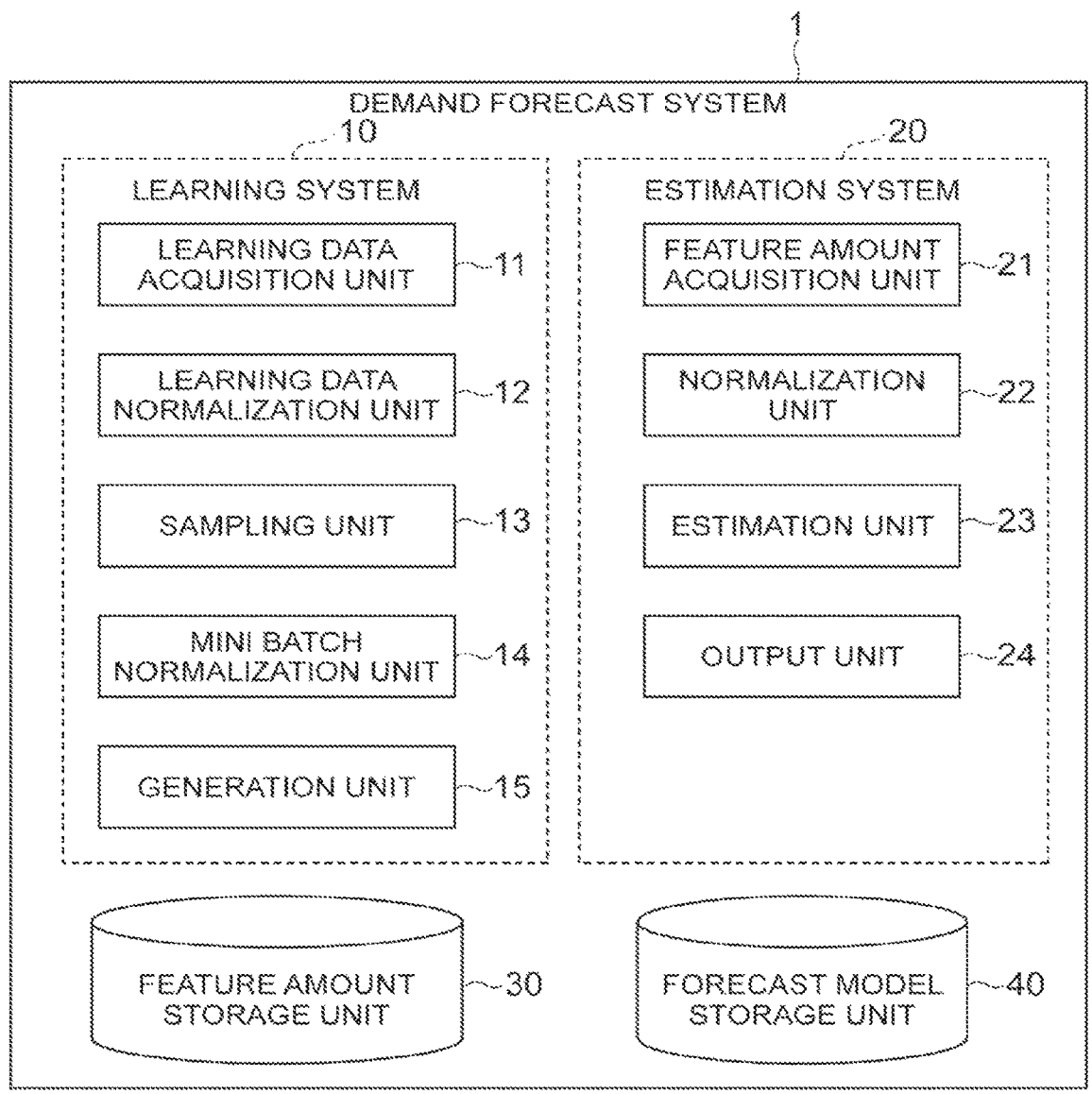
FIG. 1 is a diagram illustrating a functional configuration of a demand forecast system 1 including a learning system and an estimation system according to the present embodiment.

An embodiment of a learning system, an estimation system and a learned model according to the present invention will be described with reference to the accompanying drawings. Meanwhile, the same components are denoted, if possible, by the same reference numerals and signs, and thus description thereof will not be repeated.

FIG. 1 is a diagram illustrating a functional configuration of a demand forecast system 1 including a learning system 10 and an estimation system 20 according to the present embodiment. The demand forecast system 1 is a system for performing a forecast of demand for a predetermined service for each mesh indicating a predetermined geographical range using a single forecast model including a neural network which is generated through machine learning. The demand forecast system 1 of the present embodiment forecasts the number of demands for a taxi for each mesh in a certain period (for example, every 30 minutes).

In the example shown in FIG. 1, the demand forecast system 1 is configured to include the learning system 10, the estimation system 20, a feature amount storage unit 30, and a forecast model storage unit 40, but the learning system 10, the estimation system 20, the feature amount storage unit 30, and the forecast model storage unit 40 may be configured by separate devices.

The learning system 10 is a system that generates a neural network included in a forecast model through machine learning. The learning system 10 includes a learning data acquisition unit 11, a learning data normalization unit 12, a sampling unit 13, a mini batch normalization unit 14, and a generation unit 15. Each functional unit in the learning system 10 may be configured by one device, or may be configured to be dispersed among a plurality of devices.

The estimation system 20 is a system that estimates a demand for a service using a forecast model including a neural network generated by the learning system 10. The estimation system 20 includes a feature amount acquisition unit 21, a normalization unit 22, an estimation unit 23, and an output unit 24. Each functional unit in the estimation system 20 may be configured by one device, or may be configured to be dispersed among a plurality of devices.

The feature amount storage unit 30 is a storage means for storing a feature amount for learning used in machine learning in the learning system 10 and a feature amount associated with the target period of a demand estimation. In a case where the feature amount storage unit 30 is configured to be accessible from the learning system 10 and the estimation system, it may be configured by a device of any aspect.

The forecast model storage unit 40 is a storage means for storing a forecast model including a neural network. Specifically, the forecast model storage unit 40 appropriately stores a forecast model in a process in which a neural network is generated and updated by machine learning and a learned forecast model (learned model) in which machine learning is completed. In a case where the forecast model storage unit 40 is configured to be accessible from the learning system 10 and the estimation system, it may be configured by a device of any aspect.

Meanwhile, the block diagram shown in FIG. 1 shows blocks in units of functions. These functional blocks (constituent elements) are realized by any combination of hardware and/or software. In addition, a means for realizing each functional block is not particularly limited. That is, each functional block may be realized by one device which is physically and/or logically coupled, or may be realized by two or more devices which are physically and/or logically separated from each other by connecting the plurality of devices directly and/or indirectly (for example, wiredly and/or wirelessly).

Figure 2:
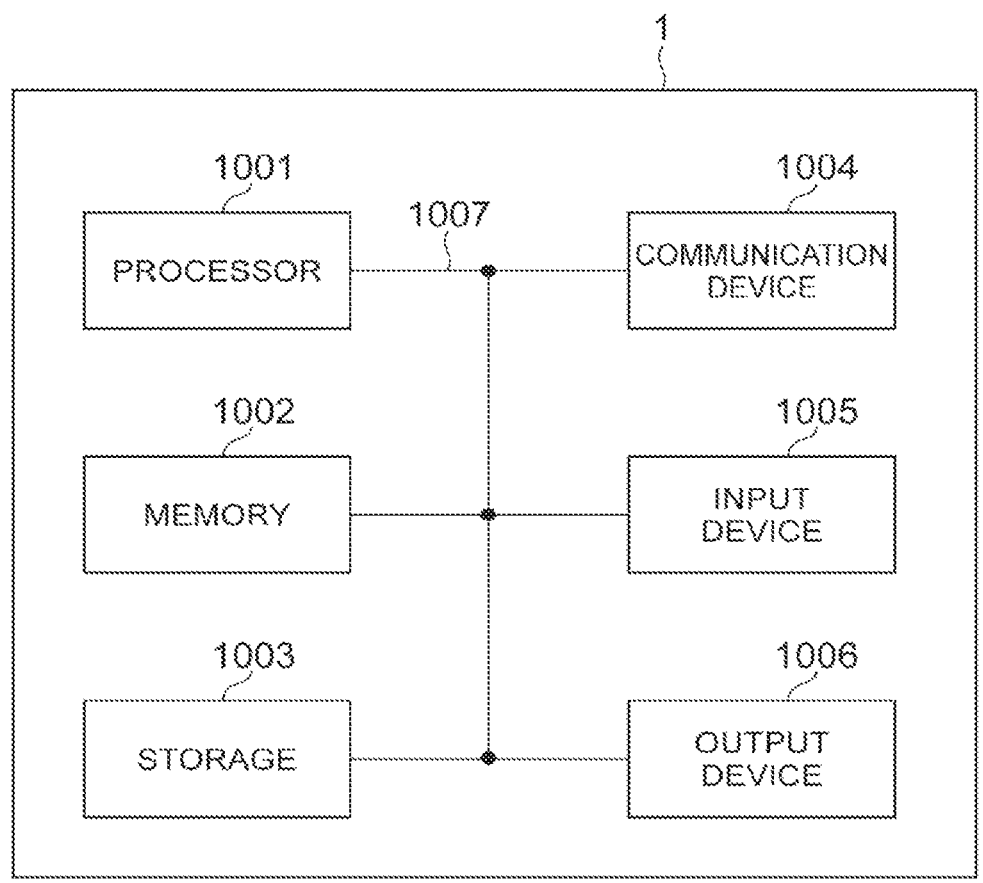
FIG. 2 is a hardware block diagram of the demand forecast system.

For example, the demand forecast system 1 in an embodiment of the present invention may function as a computer. FIG. 2 is a diagram illustrating an example of a hardware configuration of the demand forecast system 1 according to the present embodiment. The demand forecast system 1 may be physically configured as a computer device including a processor 1001, a memory 1002, a storage 1003, a communication device 1004, an input device 1005, an output device 1006, a bus 1007, and the like. Meanwhile, each of the learning system 10 and the estimation system 20 may have the hardware configuration shown in FIG. 2.

Meanwhile, in the following description, the word "device" may be replaced by a circuit, a unit, or the like. The hardware configuration of the demand forecast system 1 may be configured to include one or a plurality of devices shown in FIG. 2, or may be configured without including some devices.

The processor 1001 performs an arithmetic operation by reading predetermined software (a program) on hardware such as the processor 1001 or the memory 1002, and thus each function in the demand forecast system 1 is realized by controlling communication in the communication device 1004 and reading and/or writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. In addition, the processor 1001 may be configured to include a graphics processing unit (GPU). For example, each of the functional units 11 to 15, 21 to 24, and the like shown in FIG. 1 may be realized by the processor 1001.

In addition, the processor 1001 reads out a program (a program code), a software module and data from the storage 1003 and/or the communication device 1004 into the memory 1002, and executes various types of processes in accordance therewith. An example of the program which is used includes a program causing a computer to execute at least some of the operations described in the foregoing embodiment. For example, each of the functional units 11 to 15, 21 to 24 of the demand forecast system 1 is stored in the memory 1002, and may be realized by a control program which is operated by the processor 1001. The execution of various types of processes described above by one processor 1001 has been described, but these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (a program code), a software module, or the like that can executed in order to carry out a learning method and an estimation method according to an embodiment of the present invention.

The storage 1003 is a computer readable recording medium, and may be constituted by at least one of, for example, an optical disc such as a compact disc ROM (CD-ROM), a hard disk drive, a flexible disk, a magnetooptic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including the memory 1002 and/or the storage 1003, a server, or another suitable medium.

The communication device 1004 is hardware (transmitting and receiving device) for performing communication between computers through a wired and/or wireless network, and is also referred to as, for example, a network device, a network controller, a network card, a communication module, or the like.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be constituted by a single bus, or may be constituted by a different bus between devices.

In addition, the demand forecast system 1, the learning system 10 or the estimation system 20 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, at least one of these types of hardware may be mounted in the processor 1001.

Figure 3:
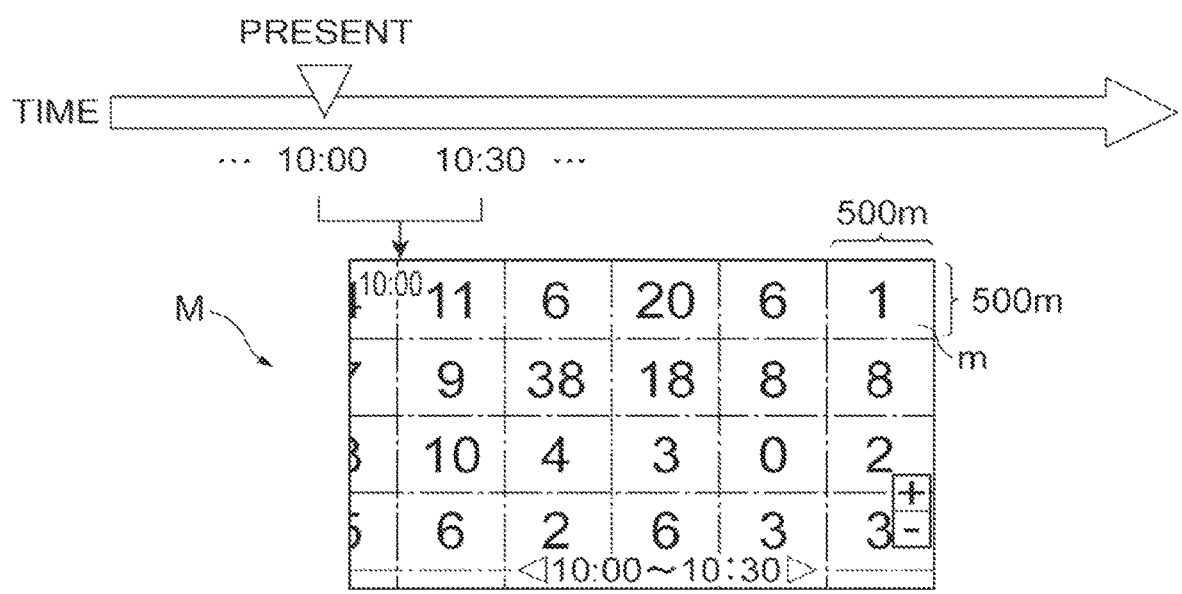
FIG. 3 is a diagram schematically illustrating an image of the number of demands for a taxi which is output by the demand forecast system of the present embodiment.

FIG. 3 is a diagram schematically illustrating an image of the number of demands for a taxi which is output by the demand forecast system 1 of the present embodiment. The demand forecast system 1 forecasts the number of demands for a taxi for each mesh of a mesh group M for a predetermined time (for example, 30 minutes from the present time, that is 10:00 to 10:30), for example, using the present time (10:00) as a reference time. The forecast number of demands is a number which is superimposed and displayed on each mesh in FIG. 3. One mesh m is, for example, a demarcated geographical range with a square of 500 m side.

The number of demands is obtained by inputting a feature amount of the number of demands, population, weather or the like for each of a plurality of meshes in a plurality of past periods associated with a reference time (a target period) which is a target for a forecast to a single forecast model regardless of a mesh.

The forecast model includes a neural network. The neural network is generated by inputting a feature amount of the number of demands, population, weather or the like for each a plurality of meshes in a plurality of past periods associated with a certain reference period, as a feature amount for learning, to the neural network and performing machine learning including error calculation (error back-propagation) on the basis of a demand forecast value obtained as the result and an actual demand value in a reference period. Various loss functions can be applied to the error calculation.

Figure 4:
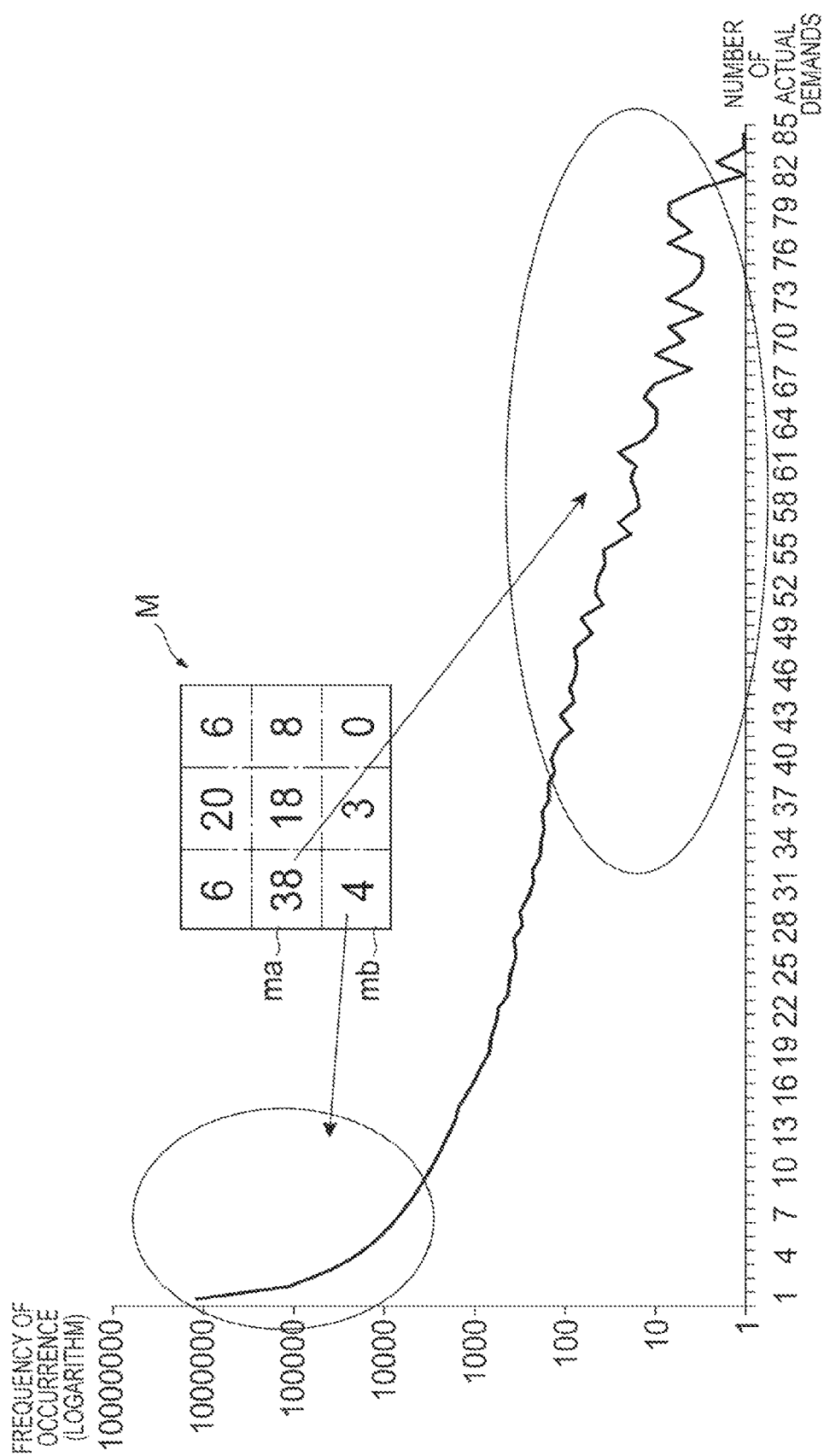
FIG. 4 is a diagram illustrating a problem to be solved by the demand forecast system of the present embodiment.

FIG. 4 is a diagram illustrating a problem to be solved by the demand forecast system 1 of the present embodiment. Specifically, FIG. 4 is a graph illustrating the frequency of occurrence of the number of actual demands which is the number of demands for a taxi in a certain period (for example, every 30 minutes) and a certain mesh. As shown in FIG. 4, there is a large deviation in the tendency of occurrence of the number of actual demands. For example, the number of actual demands in a mesh ma in a certain period is "38." A period having such a relatively large number of actual demands and the frequency of occurrence of a mesh are extremely small in the percentage of the entirety of acquired data. On the other hand, the number of actual demands in a mesh mb in a certain period is "4." A period having such a relatively small number of actual demands and the frequency of occurrence of a mesh are large in the percentage of the entirety of acquired data.

In the present embodiment, as described above, a demand forecast is performed using a single forecast model. In a case where there is a deviation between meshes in the distribution of the frequencies of occurrence of the number of demands in input data when a forecast is performed by a single forecast model, errors in a forecast model are likely to increase. Specifically, as shown in FIG. 4, in a forecast model including a neural network generated through machine learning in which such data is used as data for learning due to the frequency of occurrence of a large number of actual demands being small, errors are likely to increase.

In addition, in the generation of a neural network through machine learning, it is known that, using a large volume of data for learning as 1 epoch, a predetermined number of pieces of data are randomly sampled as mini batches from a learning data group of 1 epoch, and normalization is performed on a feature amount included in the learning data for each mini batch. However, normalization with respect to the mini batch has no effect on reducing errors due to a deviation of the tendency of occurrence of the number of actual demands.

In order to solve such a problem, the demand forecast system 1 of the present embodiment reduces errors even in a case where there is a deviation in the distribution of the frequencies of occurrence of the number of demands on the occasion of a forecast of the number of demands for a service for each mesh using a single forecast model, and makes it possible to perform a high-accuracy forecast.

Figure 5:
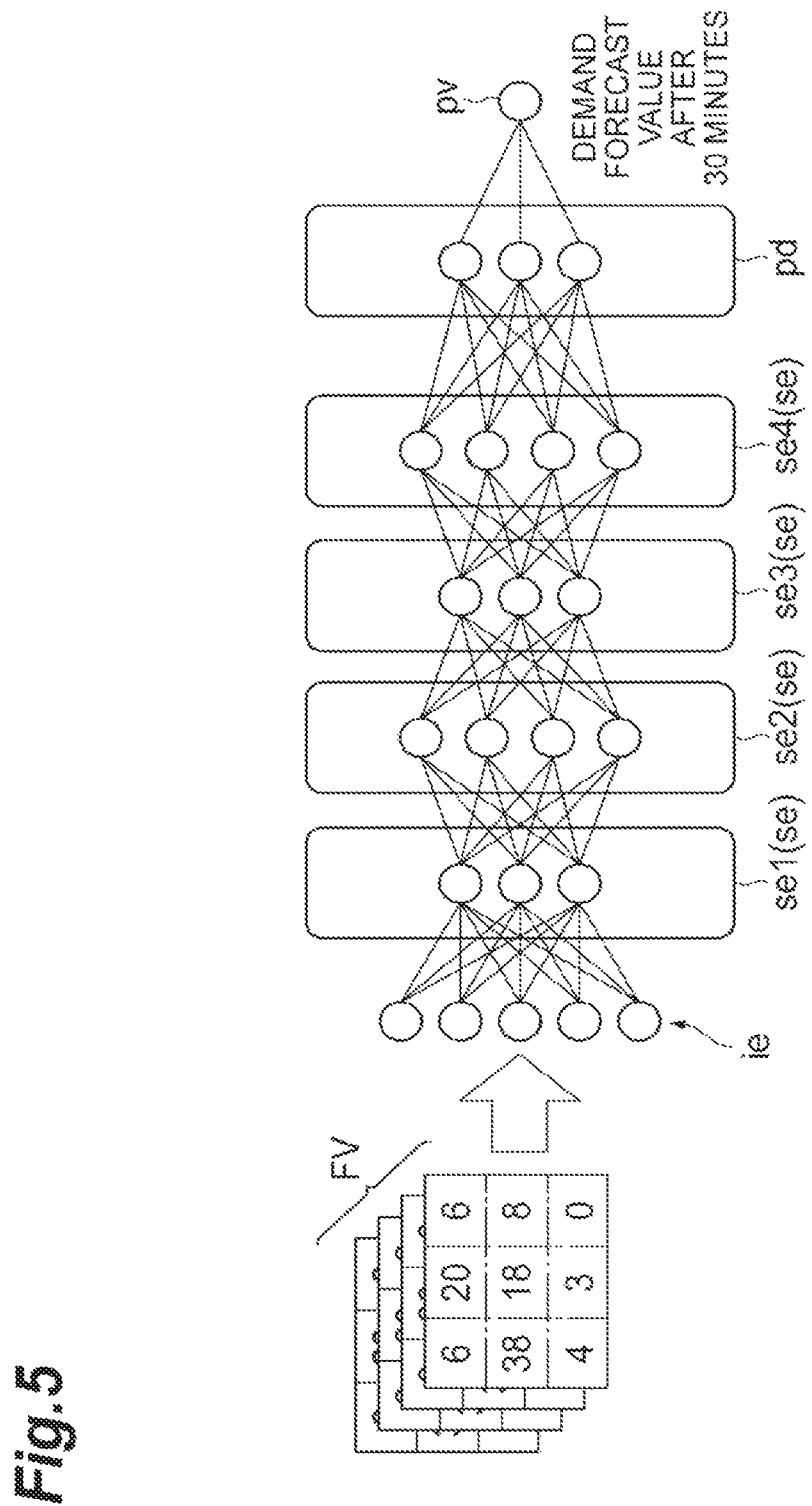
FIG. 5 is a diagram schematically illustrating the generation of a neural network included in a forecast model of the present embodiment.

FIG. 5 is a diagram schematically illustrating the generation of a neural network included in the forecast model of the present embodiment. A neural network NN is a feature amount FV for each mesh associated with the past period, and outputs a demand forecast value pv which is the number of forecasts of demand for a service in a predetermined target period associated with a period using the feature amount FV including the number of demands for a service in each mesh in each period normalized at least for each mesh as an input value.

Specifically, in the phase of learning, the feature amount FV of the number of demands, population, weather or the like for each of a plurality of meshes in a plurality of past periods associated with a certain reference time (a target period) is input as a feature amount for learning to the neural network NN. In addition, in the phase of a demand forecast, the feature amount FV of the number of demands, population, weather or the like for each of a plurality of meshes in a plurality of past periods associated with a target period of a forecast is input to the neural network NN.

The neural network NN includes an input layer ie, a hidden layer se, and an output layer pd. A feature amount for learning is input to the input layer ie as an input vector of the number of dimensions according to the number of pieces of data of a feature amount. A demand forecast value PV is output through conversion based on the functions of the input layer ie, the hidden layer se, and the output layer pd. The demand forecast value PV is the number of forecasts of demand for a service in a target period.

The learning system 10 of the present embodiment performs machine learning on the basis of the demand forecast value PV and an actual demand value in a target period, and generates (updates) the neural network NN. Specifically, the learning system 10 performs error calculation (error back-propagation) on the basis of the demand forecast value PV and an actual demand value, and optimizes function coefficients of each layer. Meanwhile, the number of hidden layers se is not limited to the shown example. In addition, various known methods can be applied to the generation of the neural network NN and machine learning.

Meanwhile, the learned model which is a forecast model including the learned neural network NN can be understood as a program, read or referenced by a computer, for causing a computer to execute a predetermined process and causing the computer to realize a predetermined function.

That is, the learned model of the present embodiment is used in a computer including a CPU and a memory. Specifically, the CPU of a computer performs an arithmetic operation based on learned weighting coefficients, response functions and the like corresponding to each layer with respect to input data (for example, a feature amount including the number of demands or the like) which is input to the input layer of a neural network in accordance with a command from the learned model stored in a memory, and operates so as to output a result (the number of demand forecasts) from an output layer.

Referring back to FIG. 1, each functional unit of the demand forecast system 1 will be described. First, each functional unit of the learning system 10 will be described.

The learning data acquisition unit 11 acquires learning data which is supplied to machine learning in order to generate a neural network included in the forecast model. The learning data can include a feature amount for learning and an actual demand value associated with the feature amount for learning.

The feature amount for learning includes various feature amounts for each mesh in the past period associated with a certain reference time (a period), and includes at least the number of demands for a service in each mesh in each period. FIG. 6 is a diagram illustrating an example of a feature amount for learning. In the example shown in FIG. 6, the feature amount for learning includes various feature amounts for each mesh (mesh ID: A1, A2, A3, . . . ) associated with a reference period. In the present embodiment, the number of demands for a taxi, population, and weather in a plurality of past periods (30 minutes ago to the present time, an hour ago to 30 minutes ago, and 1.5 hours ago to an hour ago) in each mesh are used as the feature amounts.

The number of demands for a taxi can be acquired on the basis of position information periodically collected by a GPS device installed in an individual taxi and the state of a passenger car (the presence or absence of a passenger). The population in each mesh can be acquired using the network of a portable terminal. Specifically, the population for each mesh can be estimated on the basis of population data and the number of terminals in a service area for each mesh acquired from a positional relationship between a mobile terminal and a base station. The weather for each mesh can be acquired from various information services for providing information relating to the weather. Meanwhile, in the present embodiment, the number of demands, the population, and the weather are acquired as the feature amount for learning, but a feature amount for learning to be acquired is not limited to these feature amounts.

The actual demand value is the number of actual demands for a service. In the present embodiment, the learning data acquisition unit 11 acquires the number of actual demands for a taxi in a reference period as an actual demand value together with the feature amount for learning. In the example shown in FIG. 6, the learning data acquisition unit 11 acquires, for example, the number of actual demands for a taxi from "2017/12/15 12:00" to 30 minutes later in association with the feature amount for learning in the reference period.

FIG. 7 is a diagram schematically illustrating processes in the learning system 10. In the following description, each functional unit of the learning system 10 will be described with reference to both FIG. 1 and FIG. 7. As shown in process p11 of FIG. 7, the learning data acquisition unit 11 acquires a feature amount fv1 in each mesh in a fixed period which is a target for machine learning. Meanwhile, values included in signs fv1 to fv7 shown in FIG. 7 are schematically illustrated for the purpose of description, and are not strictly calculated.

The learning data normalization unit 12 normalizes a feature amount for learning included in learning data for each mesh (mesh normalization). Particularly, the learning data normalization unit 12 normalizes at least the number of demands out of feature amounts included in the feature amount for learning. The normalization can be performed using various methods, and involves, for example, converting each piece of data so that the distribution of the data is set to an average of 0 and a variance of 1.

In the present embodiment, the learning data normalization unit 12 normalizes at least the number of demands for a taxi for each mesh. Specifically, the learning data normalization unit 12 obtains the normalized number of demands by dividing the number of demands in one mesh by a maximum value out of data of the number of demands in a fixed period which is a target for machine learning in the mesh. In this way, as shown in process p12 of FIG. 7, the learning data normalization unit 12 normalizes a feature amount for learning fv2 acquired by the learning data acquisition unit 11 for each mesh, and calculates a normalized feature amount for learning fv3.

Meanwhile, the learning data normalization unit 12 may perform normalization for each feature amount for learning that belongs to the same mesh and is associated with the same predetermined temporal attribute. Specifically, the learning data normalization unit 12 may extract feature amounts that belong to the same mesh and are associated with an attribute such as the same day and time, and obtain normalized feature amounts by dividing the extracted feature amounts by a maximum value out of the extracted feature amounts.

In addition, the learning data normalization unit 12 may determine the necessity of performing normalization on a feature amount on the basis of a deviation between meshes in the distribution of the frequencies of occurrence of a value of the feature amount in the feature amount for learning.

As described with reference to FIG. 4, the demand forecast system 1 of the present embodiment can reduce errors of a forecast model that may occur in a case where there is a large deviation between meshes in the tendency of the frequency of occurrence of the number of actual demands. In view of such a problem, the learning data normalization unit 12 may analyze the number of demands for a taxi (the number of actual demands) in the feature amount for learning acquired by the learning data acquisition unit 11 using a known statistical method, and perform normalization for each mesh on the acquired feature amount for learning with respect to the number of demands in a case where a deviation between meshes in the frequency of occurrence of the number of actual demands is equal to or greater than a predetermined degree.

The sampling unit 13 samples a predetermined number of feature amounts for learning out of a plurality of feature amounts for learning as mini batches. In the present embodiment, the sampling unit 13 samples a predetermined number of feature amounts for learning out of the feature amounts for learning normalized by the learning data normalization unit 12. For example, in a case where data for learning of 1 epoch (for example, 5000 meshes×50 periods×500 days=data of 75 million records) is acquired by the learning data acquisition unit 11, the sampling unit 13 randomly samples a predetermined number (for example, 100 records) of pieces of data for learning, and acquires the sampled data as one mini batch. In this way, as shown in process p13 of FIG. 7, the sampling unit 13 samples a predetermined number in the feature amount for learning fv3 normalized by the learning data normalization unit 12, and acquires a feature amount for learning fv4 as a mini batch.

In addition, the sampling unit 13 may sample a feature amount for learning associated with an actual demand value equal to or greater than a predetermined value instead of randomly sampling the feature amount for learning. Thereby, since a feature amount for learning associated with a mesh having a large scale of the number of demands is used in machine learning, it is possible to improve the accuracy of a demand forecast for a mesh of the number of demands having a small frequency of occurrence and a large scale.

The mini batch normalization unit 14 normalizes the feature amount for learning sampled by the sampling unit 13 for each mini batch. Specifically, the mini batch normalization unit 14 performs normalization for each mini batch on at least some of feature amounts out of the feature amounts included in the feature amount for learning. Therefore, the mini batch normalization unit 14 may perform normalization for each mini batch on only the number of demands out of the feature amounts for learning, or may further perform normalization on feature amounts such as the population and the weather. In this way, as shown in process p14 of FIG. 7, the mini batch normalization unit 14 normalizes the sampled feature amount for learning fv4 for each mini batch, and acquires a normalized feature amount for learning fv5.

The generation unit 15 acquires a demand forecast value that is the number of forecasts of demand for a service which is obtained by inputting a feature amount for learning including at least the number of demands normalized by the learning data normalization unit 12 to a neural network, performs machine learning on the basis of the acquired demand forecast value and an actual demand value, and generates the neural network.

In the present embodiment, the generation unit 15 inputs a feature amount for learning normalized by the mini batch normalization unit 14 to the neural network NN, and acquires a demand forecast value in a target period corresponding to the feature amount for learning. That is, as shown in process p15 of FIG. 7, the generation unit 15 inputs the normalized feature amount for learning fv5 to the neural network NN, estimates a demand for a taxi, and acquires a demand forecast value fv6.

The generation unit 15 performs machine learning including error calculation on the basis of the acquired demand forecast value and an actual demand value corresponding to the feature amount for learning, and performs the optimization and update of the neural network NN. That is, as shown in process p16 of FIG. 7, the generation unit 15 performs machine learning using the demand forecast value fv6, and generates the neural network NN.

Meanwhile, the generation unit 15 performs error calculation for machine learning using an actual demand value converted by normalization coefficients used in the learning data normalization unit 12. Specifically, since the demand forecast value which is output by the neural network NN is based on the number of demands normalized for each mesh, the generation unit 15 performs error calculation using the actual demand value normalized by the normalization coefficients used in the learning data normalization unit 12 so as to correspond to the output demand forecast value.

Meanwhile, the generation unit 15 may use the values (the normalization coefficients) used in the normalization of the feature amount for learning for each mesh in the learning data normalization unit 12, as feature amounts input to the neural network NN, on the occasion of the generation of the neural network NN through machine learning. Thereby, a discrepancy in the property of the action of the normalized feature amount due to a difference between meshes in the scale of its value is reflected in the generated neural network NN.

Next, each functional unit of the estimation system 20 will be described. The estimation system 20 estimates the number of demands for a taxi using a single forecast model (a forecast model which is not based on a mesh) including the neural network NN generated by the learning system 10.

The feature amount acquisition unit 21 acquires a feature amount for each mesh associated with the target period of a demand estimation, that is, a feature amount including the number of demands for a service in the mesh in a period associated with at least the target period. Specifically, for example, in a case where the present time (the present time to 30 minutes later) is set to the target period of a demand forecast, the feature amount acquisition unit 21 acquires a feature amount for each mesh in a plurality of past periods before the present time. The acquired feature amount includes at least the number of demands for a taxi in each period and each mesh. The content of items or the like in the feature amount is the same as the feature amount for learning acquired by the learning data acquisition unit 11.

The normalization unit 22 normalizes the feature amount acquired by the feature amount acquisition unit 21 for each mesh. In the present embodiment, the normalization unit 22 normalizes at least the number of demands out of the feature amounts. Specifically, similarly to the normalization of the feature amount for learning for each mesh by the learning data normalization unit 12, the normalization unit 22 normalizes at least the number of demands out of the feature amounts acquired by the feature amount acquisition unit 21 for each mesh.

The estimation unit 23 inputs a feature amount including the number of demands normalized by the normalization unit 22 to the neural network NN of the forecast model, and estimates the number of demands for a service in the target period of a forecast. Specifically, similarly to the acquisition of a demand forecast value by the generation unit 15, the estimation unit 23 inputs a feature amount normalized by the normalization unit 22 to the neural network NN, and estimates the number of demands for a taxi corresponding to the feature amount.

The output unit 24 outputs the number of demands estimated by the estimation unit 23 as a demand estimation value. Meanwhile, the output unit 24 outputs a demand estimation value converted by the normalization coefficients used in the normalization unit 22. That is, since the number of demands estimated by the estimation unit 23 is obtained by inputting the number of demands normalized by the normalization unit 22 to the neural network NN, the output unit 24 outputs the number of demands inversely converted by the normalization coefficients used in normalization as a demand estimation value.

Figure 8:
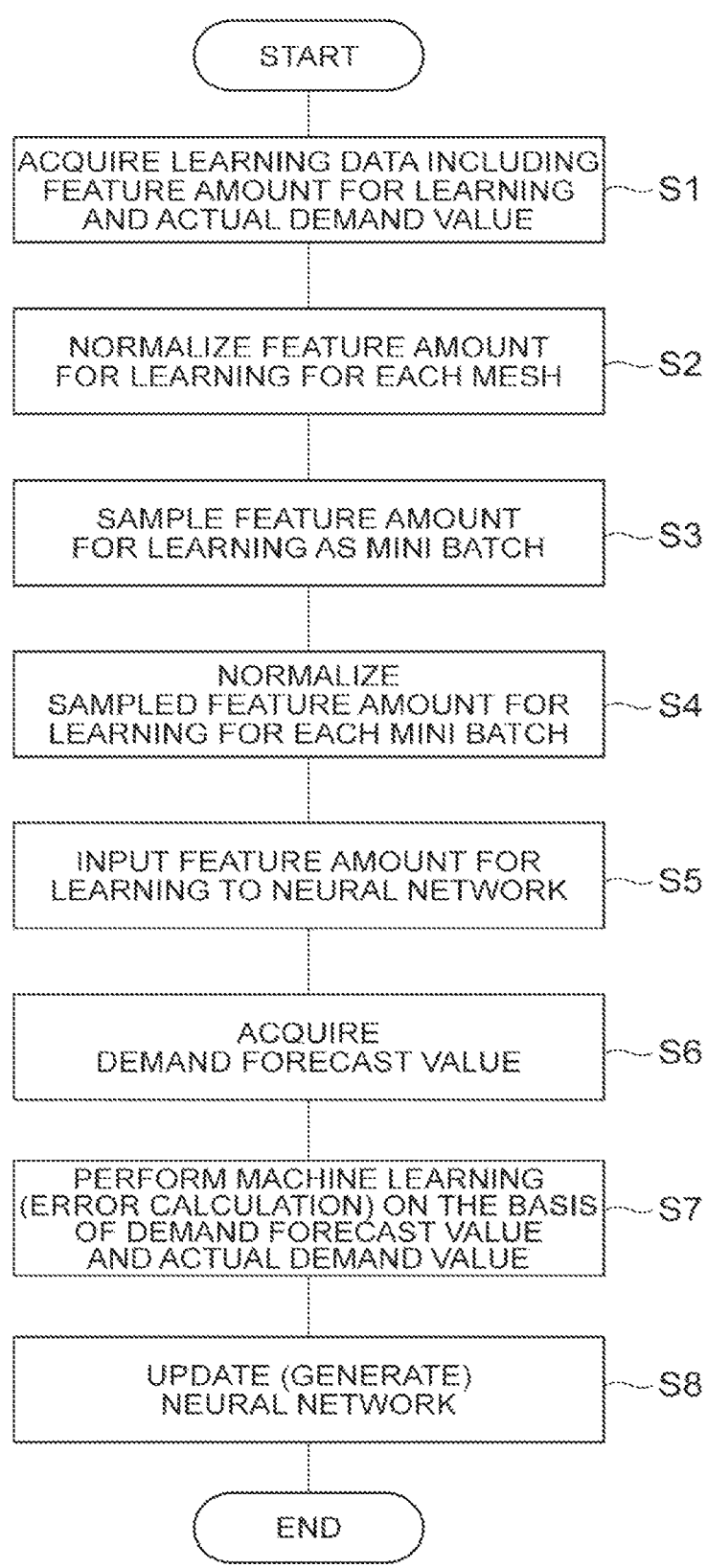
FIG. 8 is a flow chart illustrating process content of a learning method of the present embodiment.

Next, a learning method of generating a neural network in the demand forecast system 1 will be described with reference to FIG. 8. FIG. 8 is a flow chart illustrating process content of a learning method of the present embodiment.

In step S1, the learning data acquisition unit 11 acquires learning data which is supplied to machine learning in order to generate the neural network NN included in the forecast model. The learning data includes a feature amount for learning and an actual demand value.

In step S2, the learning data normalization unit 12 normalizes the feature amount for learning included in the learning data for each mesh.

In step S3, the sampling unit 13 samples a predetermined number of feature amounts for learning out of a plurality of feature amounts for learning as mini batches. In the subsequent step S4, the mini batch normalization unit 14 normalizes the feature amount for learning sampled by the sampling unit 13 for each mini batch.

In step S5, the generation unit 15 inputs the feature amount for learning to the neural network NN. Subsequently, in step S6, the generation unit 15 acquires a demand forecast value in a target period corresponding to the input feature amount for learning.

In step S7, the generation unit 15 performs machine learning including error calculation on the basis of an actual demand value corresponding to the acquired demand forecast value and the feature amount for learning. In step S8, the generation unit 15 updates (generates) the neural network NN on the basis of the machine learning in step S7.

Figure 9:
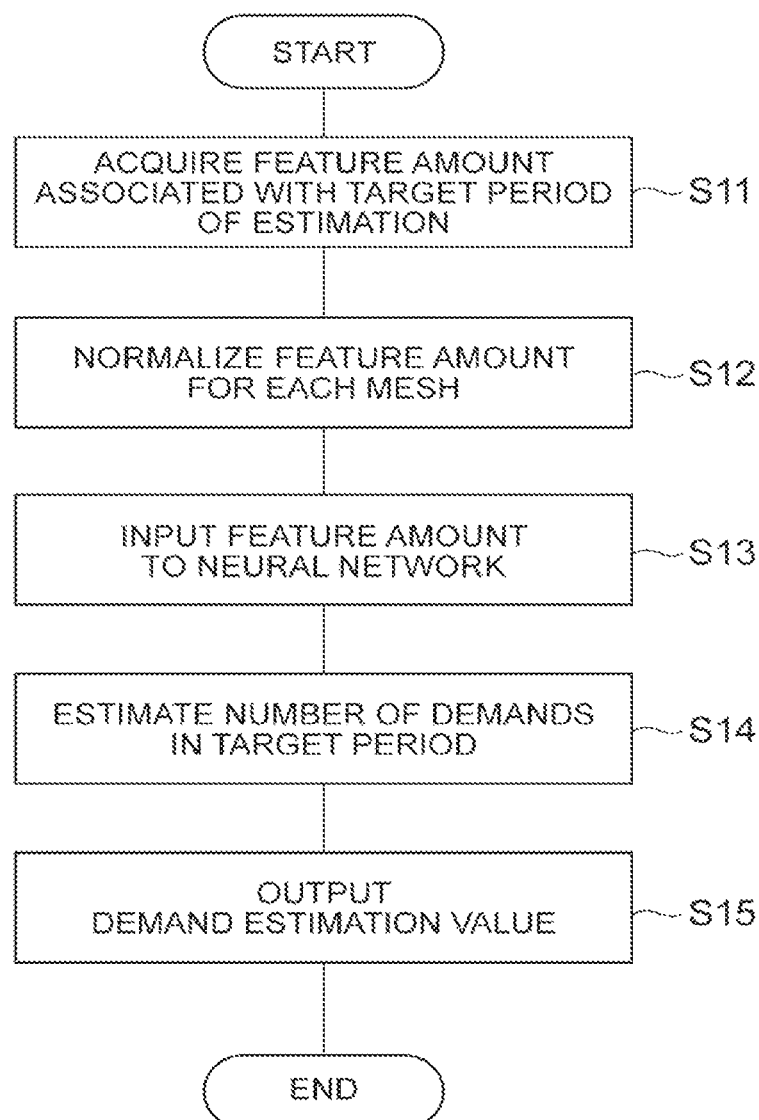
FIG. 9 is a flow chart illustrating process content of an estimation method of the present embodiment.

Next, a method of estimating demand for a service using a single forecast model including the neural network NN in the demand forecast system 1 will be described with reference to FIG. 9. FIG. 9 is a flow chart illustrating process content of an estimation method of the present embodiment.

In step S11, the feature amount acquisition unit 21 acquires a feature amount for each mesh associated with the target period of a demand estimation. The acquired feature amount includes at least the number of demands for a taxi in each mesh in the past period associated with the target period.

In step S12, the normalization unit 22 normalizes the feature amount acquired by the feature amount acquisition unit 21 in step S11 for each mesh.

In step S13, the estimation unit 23 inputs the feature amount including the number of demands normalized by the normalization unit 22 in step S11 to the neural network NN of the forecast model. In the subsequent step S14, the estimation unit 23 estimates the number of demands for a taxi. Specifically, the estimation unit 23 acquires the number of demands which is output by the neural network NN.

In step S15, the number of demands estimated by the estimation unit 23 in step S14 is output as a demand estimation value.

Figure 10:
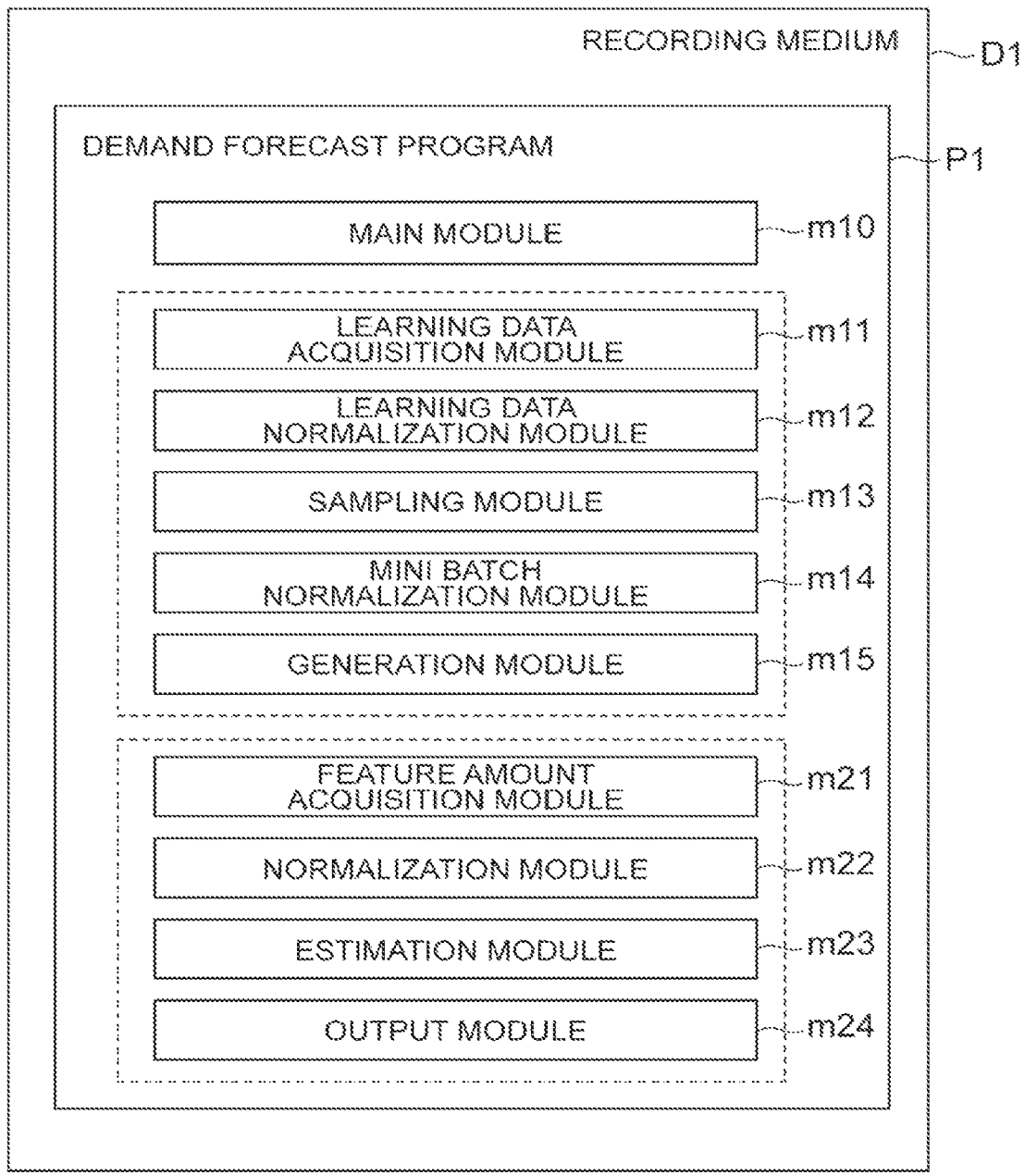
FIG. 10 is a diagram illustrating a configuration of a demand forecast program.

Next, a demand forecast program for causing a computer to function as the demand forecast system 1 of the present embodiment will be described. FIG. 10 is a diagram illustrating a configuration of a demand forecast program P1.

The demand forecast program P1 includes modules m11 to m15 causing a computer to realize the learning system 10 and modules m21 to m24 causing a computer to realize the estimation system 20. Specifically, the demand forecast program P1 is configured to include a main module m10 for overall controlling a demand forecast process in the demand forecast system 1, a learning data acquisition module m11, a learning data normalization module m12, a sampling module m13, a mini batch normalization module m14, a generation module m15, a feature amount acquisition module m21, a normalization module m22, an estimation module m23, and an output module m24. The functions of the learning data acquisition unit 11, the learning data normalization unit 12, the sampling unit 13, the mini batch normalization unit 14, the generation unit 15, the feature amount acquisition unit 21, the normalization unit 22, the estimation unit 23, and the output unit 24 in the demand forecast system 1 are realized by the respective modules m11 to m15 and m21 to m24. Meanwhile, the demand forecast program P1 may be configured to be transmitted through a transmission medium such as a communication line, or may be configured to be stored in a recording medium D1 as shown in FIG. 10.

In the learning system 10 of the demand forecast system 1 of the present embodiment described above, the number of demands included in the feature amount for learning is input to the neural network after it is normalized for each mesh. Thereby, the neural network in which a discrepancy in the property of the action of a feature amount due to a difference in the scale of the number of demands for each mesh has been considered is generated. Therefore, a single forecast model that makes it possible to perform a high-accuracy forecast in which errors are reduced is obtained.

In addition, in the estimation system 20 of the demand forecast system 1 of the present embodiment, the number of demands included in a feature amount associated with the target period of a demand estimation is input to the neural network after it is normalized for each mesh. Thereby, the number of demands in which a discrepancy in the property of the action of a feature amount due to a difference in the scale of the number of demands for each mesh has been considered is estimated.

In addition, in the forecast model (learned model) of the present embodiment, the feature amount including the number of demands normalized for each mesh is input to the neural network. Thereby, the forecast value of demand in which a discrepancy in the property of the action of a feature amount due to a difference in the scale of the number of demands for each mesh has been considered is output.

In addition, in a learning system according to another aspect, the learning data acquisition unit may acquire an actual demand value which is the number of actual demands for a service associated with a feature amount for learning in each mesh as learning data, and the generation unit may perform error calculation for machine learning using a demand forecast value and an actual demand value normalized by normalization coefficients used in the learning data normalization unit.

In a case where error calculation (based on, for example, error back-propagation) is performed using the normalized demand forecast value in machine learning for the generation of a neural network, errors increase due to the frequency of occurrence of meshes having a large number of demands being small. According to the above aspect, since the demand forecast value converted by normalization coefficients used in the normalization of learning data is used in error calculation for machine learning, a neural network that makes it possible to perform a higher-accuracy forecast is obtained.

In addition, the learning system according to another aspect may further include a sampling unit that samples a predetermined number of feature amounts for learning out of a plurality of feature amounts for learning as mini batches and a mini batch normalization unit that normalizes the feature amounts for learning sampled by the sampling unit for each mini batch, the generation unit may input the feature amounts for learning normalized by the mini batch normalization unit to the neural network, and the sampling unit may samples feature amounts for learning associated with an actual demand value equal to or greater than a predetermined value.

According to the above aspect, since the feature amount for learning associated with an actual demand value having a large scale is input to the neural network on the occasion of the generation of the neural network through machine learning, it is possible to obtain a forecast model that makes it possible to perform a high-accuracy demand forecast for a mesh having a large scale of the number of demands.

In addition, in the learning system according to another aspect, the generation unit may perform machine learning by inputting normalization coefficients used in the normalization of a feature amount for learning for each mesh in the learning data normalization unit to the neural network.

According to the above aspect, since the normalization coefficients used in the normalization of a feature amount for learning for each mesh are input to the neural network for the purpose of machine learning, the neural network in which a discrepancy in the property of the action of the normalized feature amount due to a difference between meshes in the scale of its value is reflected is generated.

In addition, in the learning system according to another aspect, the learning data normalization unit may perform normalization for each feature amount for learning associated with the same predetermined temporal attribute.

According to the above aspect, the neural network in which a discrepancy in the property of the action of the normalized feature amount due to a difference between meshes and between temporal attributes in the scale of its value is reflected is generated.

In addition, in the learning system according to another aspect, the learning data normalization unit may determine the necessity of performing normalization on a feature amount on the basis of a deviation between meshes in the distribution of the frequencies of occurrence of a value of the feature amount in the feature amount for learning.

According to the above aspect, in a case where a deviation between meshes in the distribution of the frequencies of occurrence of the value of a feature amount is large, the normalization of the feature amount for each mesh is effective in error reduction or the like. Therefore, according to the above aspect, for example, a configuration is made so that normalization is performed in a case where a deviation between meshes in the distribution of the frequencies of occurrence of the value of a feature amount is large, whereby it is possible to perform a process of normalization appropriately contributing to the generation of a neural network that makes it possible to perform a high-accuracy forecast.

In addition, in the learning system according to another aspect, the forecast of demand for a service may be a forecast of demand for a taxi, and the feature amount for learning may include at least any of information relating to the population in each mesh in each period and information relating to the weather.

According to the above aspect, since machine learning is performed using the feature amount for learning including at least any of the information relating to the population for each mesh and the information relating to the weather in a forecast of demand for a taxi, it is possible to obtain a forecast model that makes it possible to perform a higher-accuracy forecast in which the population or the weather is considered.

In addition, in the estimation system according to another aspect, the output unit may output a demand estimation value inversely converted by normalization coefficients used in the normalization unit.

According to the above aspect, since the value of the number of demands according to input of the normalized value is output by the neural network, an appropriate demand estimation value is output by inversely converting a value which is output by normalization coefficients used in normalization.

Hereinbefore, the present embodiments have been described in detail, but it is apparent to those skilled in the art that the present embodiments should not be limited to the embodiments described in this specification. The present embodiments can be implemented as modified and changed aspects without departing from the spirit and scope of the present invention, which are determined by the description of the scope of claims. Therefore, the description of this specification is intended for illustrative explanation only, and does not impose any limited interpretation on the present embodiments.

The order of the processing sequences, the sequences, the flowcharts, and the like of the aspects/embodiments described above in this specification may be changed as long as they are compatible with each other. For example, in the methods described in this specification, various steps as elements are described in an exemplary order but the methods are not limited to the described order.

Information or the like can be output from an upper layer (or a lower layer) to a lower layer (or an upper layer). Information or the like may be input or output via a plurality of network nodes.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects described in this specification may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Regardless of whether it is called software, firmware, middleware, microcode, hardware description language, or another name, software can be widely construed to refer to an instruction, an instruction set, codes, code segments, program codes, a program, a sub-program, a software module, an application, a software application, a software package, a routine, a sub-routine, an object, an executable file, an execution thread, an order, a function, or the like.

In addition, Software, an instruction, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of a transmission medium.

Information, a signal or the like described in this specification may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in this specification and/or the terms required for understanding this specification may be substituted by terms having the same or similar meanings.

The terms "system" and "network" which are used in this specification are used interchangeably.

In addition, information, parameters, and the like described in this specification may be expressed as absolute values, may be expressed by values relative to a predetermined value, or may be expressed by other corresponding information.

An expression "on the basis of ~" which is used in this specification does not refer to only "on the basis of only ~," unless otherwise described. In other words, the expression "on the basis of ~" refers to both "on the basis of only ~" and "on the basis of at least ~."

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements may be employed or that the first element has to precede the second element in any form.

Insofar as the terms "include" and "including" and modifications thereof are used in this specification or the claims, these terms are intended to have a comprehensive meaning similarly to the term "comprising." Further, the term "or" which is used in this specification or the claims is intended not to mean an exclusive logical sum.

In this specification, a single device is assumed to include a plurality of devices unless only one device may be present in view of the context or the technique.

In the entire disclosure, a singular form is intended to include a plural form unless the context indicates otherwise.

REFERENCE SIGNS LIST

1 Demand forecast system
10 Learning system
11 Learning data acquisition unit
12 Learning data normalization unit
13 Sampling unit
14 Mini batch normalization unit
15 Generation unit
20 Estimation system
21 Feature amount acquisition unit
22 Normalization unit
23 Estimation unit
24 Output unit
30 Feature amount storage unit
40 Forecast model storage unit
m10 Main module
m11 Learning data acquisition module m12 Learning data normalization module
m13 Sampling module
m14 Mini batch normalization module
m15 Generation module
m21 Feature amount acquisition module
m22 Normalization module
m23 Estimation module
m24 Output module
NN Neural network
P1 Demand forecast program

The invention claimed is:

1. A learning system configured to generate a neural network through machine learning in a demand forecast system for performing a forecast of demand for a predetermined service, for each mesh of a plurality of meshes that divide a geographical area, using a single forecast model including the neural network generated through machine learning, the learning system comprising circuitry configured to:
acquire, as learning data, a feature amount for learning for each of the meshes associated with each of a plurality of periods in the past, the feature amount for learning including at least a number of demands for the predetermined service in each of the meshes in each of the periods, as a feature amount;
normalize the feature amount for learning included in the learning data over the plurality of past periods for each of the meshes, and normalize at least the number of demands in the feature amount for learning; and
input the feature amount for learning including the number of demands normalized by the circuitry to the neural network, and generate the neural network.

2. The learning system according to claim 1, wherein the circuitry acquires an actual demand value that is a number of actual demands for the predetermined service associated with the feature amount for learning in each of the meshes as the learning data, and
the circuitry performs error calculation for the machine learning using the demand forecast value and the actual demand value normalized by normalization coefficients used in the normalization of the feature amount for learning.

3. The learning system according to claim 2, wherein the circuitry is further configured to:
sample a predetermined number of feature amounts for learning out of a plurality of the feature amounts tier learning as mini batches; and
normalize the feature amounts for learning sampled by the circuitry for each of the mini hatches,
wherein the circuitry inputs the feature amounts for learning normalized by the circuitry to the neural network, and
the circuitry samples the feature amounts for learning when the actual demand value associated with the feature amounts is equal to or greater than a predetermined value.

4. The learning system according to claim 1, wherein the circuitry performs the machine learning by inputting normalization coefficients used in normalization of the feature amount for learning for each of the meshes to the neural network.

5. The learning system according to claim 1, wherein the circuitry performs normalization for each feature amount for learning that belongs to a same mesh and is associated with a same day and time.

6. The learning system according to claim 1, wherein the circuitry determines a necessity of performing normalization on a feature amount on the basis of a deviation between the meshes in a distribution of frequencies of occurrence of a value of the feature amount in the feature amount for learning.

7. The learning system according to claim 1, wherein the forecast of demand for the predetermined service is a forecast of demand for a taxi, and
the feature amount for learning includes at least any of information relating to population in each of the meshes in each period and information relating to weather.

8. The learning system according to claim 2, wherein the circuitry performs the machine learning by inputting normalization coefficients used in normalization of the feature amount for learning for each of the meshes in the learning data normalization unit to the neural network.

9. The learning system according to claim 3, wherein the circuitry performs the machine learning by inputting normalization coefficients used in normalization of the feature amount for learning for each of the meshes in the learning data normalization unit to the neural network.

10. An estimation system configured to estimate demand for a predetermined service in a demand forecast system for performing a forecast of demand for the predetermined service, for each mesh of a plurality of meshes that divide a geographical area, using a single forecast model including a neural network generated through machine learning, the estimation system comprising circuitry configured to:
acquire a feature amount for each of the meshes associated with a target period of a demand estimation, the feature amount including at least a number of demands for the predetermined service in the mesh in a past period associated with the target period;
normalize the feature amount acquired by the circuitry over the plurality of past periods for each of the meshes, and normalize at least the number of demands in the feature amounts;
input the feature amount including the number of demands normalized by the circuitry to the neural network of the forecast model and estimate the number of demands for the predetermined service in the target period; and
output the number of demands estimated by the circuitry as a demand estimation value,
wherein the neural network of the forecast model outputs the number of demands for the predetermined service in the target period associated with the past period using, as an input value, a feature amount for each of the meshes associated with the target period, that is, a feature amount including at least the number of demands for the predetermined service in each of the meshes in the past period normalized for each mesh.

11. The estimation system according to claim 10, wherein the circuitry outputs a demand estimation value inversely converted by normalization coefficients used in the normalization of the feature amount.

* * * * *